United States Patent [19]
Dirven et al.

[11] Patent Number: 5,561,000
[45] Date of Patent: Oct. 1, 1996

[54] GAS DIFFUSION ELECTRODE WITH CATALYST FOR AN ELECTROCHEMICAL CELL WITH SOLID ELECTROLYTE AND METHOD FOR MAKING SUCH AN ELECTRODE

[75] Inventors: Paul Dirven, Westerlo; Willy Engelen, Balen, both of Belgium

[73] Assignee: Vlaamse Instelling Voor Technologisch Onderzoek, Mor, Belgium

[21] Appl. No.: 465,110

[22] Filed: Jun. 5, 1995

[30] Foreign Application Priority Data

Jun. 7, 1994 [BE] Belgium ................ 09400561

[51] Int. Cl.⁶ ............................... H01M 4/86
[52] U.S. Cl. ................. 429/42; 429/40; 429/45; 429/209; 429/212; 429/217; 204/291; 204/292; 204/294; 427/115; 427/122
[58] Field of Search ................ 429/42, 27, 212, 429/209, 217, 44, 45, 40; 204/290 R, 291, 294, 292, 286, 284; 427/115, 122

[56] References Cited

U.S. PATENT DOCUMENTS

| | | |
|---|---|---|
| 4,185,131 | 1/1980 | Goller et al. . |
| 4,804,592 | 2/1989 | Vanderborgh et al. . |
| 4,849,253 | 7/1989 | Maricle et al. . |
| 4,927,514 | 5/1990 | Solomon et al. ............ 204/290 |
| 5,242,765 | 9/1993 | Naimer et al. ................ 429/42 |
| 5,312,701 | 5/1994 | Khasim et al. ............... 429/42 |
| 5,441,823 | 8/1995 | Naimer et al. ................ 429/42 |

FOREIGN PATENT DOCUMENTS

| | | |
|---|---|---|
| 0560295A1 | 9/1993 | European Pat. Off. . |
| 0569062A2 | 11/1993 | European Pat. Off. . |

OTHER PUBLICATIONS

"Manufacture of Electrode for Fuel Cell" (S. Akitoshi), *Patent Abstracts of Japan*, vol. 16 No. 144 (May 27, 1992).

*Primary Examiner*—Maria Nuzzolillo
*Attorney, Agent, or Firm*—Bacon & Thomas

[57] ABSTRACT

Gas diffusion electrode with catalyst for an electrochemical cell with solid electrolyte, in particular for a fuel cell with solid electrolyte, which electrode contains a hydrophobic, porous back support (12), a non-catalytic intermediate layer (13) which contains electron conductive material and an active catalytic layer (14) which contains bound catalyst particles, characterized in that the intermediate layer (*14*) contains a mixture of electron conductive material and a proton conductive ionomer, and in that the active layer (14) forms the outside layer and the catalyst particles are bound by a proton conductive ionomer

18 Claims, 1 Drawing Sheet

GAS DIFFUSION ELECTRODE WITH CATALYST FOR AN ELECTROCHEMICAL CELL WITH SOLID ELECTROLYTE AND METHOD FOR MAKING SUCH AN ELECTRODE

The invention concerns a gas diffusion electrode with catalyst for an electrochemical cell with solid electrolyte, in particular for a fuel cell with solid electrolyte, which electrode contains a hydrophobic, porous back support, a non-catalytic intermediate layer which contains electron conductive material and an active catalytic layer which contains bound catalyst particles.

Catalysts for electrochemical reactions are usually rather expensive, so that, naturally, the aim is to restrict the amount of catalyst as much as possible. This is among others the case for platinum which is the most suited catalyst up to now for many cases, including fuel cells, and is usually used in the form of platinized carbon particles.

It was found that, in the conventional electrodes for fuel cells, a large part of the catalyst is not effectively used for the reaction. Only in those places where the catalyst is accessible to the reaction gases and moreover is in contact with the electrical as well as the proton conductors, the catalyst is active.

Hence, it is obvious to restrict the amount of catalyst by providing the catalyst mainly there where it is effectively active.

Several techniques have already been developed to this aim.

According to a number of techniques, the catalyst is applied directly on the solid electrolyte membrane and not on the electrode.

The article "Thin-film catalyst layers for polymer electrolyte fuel cell electrodes" by M. S. Wilson and S. Gottesfeld, appeared in "Journal of applied electrochemistry" 22 (1992), p. 1–7, describes for example the casting or painting of an ink of solved NAFION® percent by weight/Pt-C/ glycerol on a film of PTFE (polytetrafluoroethylene), after which this coated film is hot-pressed on the solid polymer electrolyte, and the film is removed whereas the catalyst coating remains. NAFION® is the trade mark under which Dupont de Nemours markets a perfluoric carbon material. An ordinary, non-catalytic gas diffusion electrode is provided as a back support for the thin catalytic layer in the fuel cell.

According to the article "New electrodes for hydrogen/ oxygen solid polymer electrolyte fuel cell" by R. Mosdale and P. Stevens, appeared in "Solid State Ionics" 61 (1993), p. 251–255, a solution is made of Pt/C catalyst powder in ethanol, a NAFION® solution, PTFE in suspension and acetylene black. This solution is sprinkled directly on a NAFION® membrane.

AP-A-0.483.085 describes another technique whereby Pt/C catalyst particles are impregnated with a solution of an ion exchanger and are dried, non-catalyst carbon particles are impregnated with said solution of an ion exchanger and are dried, after which a mixture of these dried particles are put in a PTFE dispersion and are subsequently dried and provided on a hydrophobic binder. The thus formed electrode is then thermally bound under pressure to an ion-exchanging membrane.

Yet another technique is described in U.S. Pat. No. 5,084,144, whereby a non-catalytic carbon electrode is impregnated with an ion-exchanging polymer such as NAFION® after which the whole is catalyzed in an electrochemical way.

U.S. Pat. No. 4,876,115 describes yet another method. On a conventionally catalyzed gas diffusion electrode, for example of carbon with Pt/C particles, is provided a solution of a proton conductive material.

A more recent method is described in "Nouveau type d'ēalectrodes pour piles a combustible hydrogēane/ oxygēane" by S. Escribano, R. Mosdale and P. Aidebert, published in "Proc. Symposium Rēaliteās et Perspectives du Vēahicule Electrique", La Rochelle (France) 15–19 November 1993. This method consists in subsequently providing a mixture of acetylene black as electron conductor and a suspension of PTFE in water as an intermediate layer on a porous back support, and, after the evaporation of the solvent, a mixture of Pt/C particles as a catalyst, acetylene black as an electron conductor and a suspension of PTFE as a hydrophobic material, in order to form an active layer. The intermediate layer prevents a too profound penetration of the active layer. Finally, also a NAFION® solution is sprinkled on the active layer.

According to this method, a gas diffusion electrode is obtained as described above in the first paragraph, and which thus contains a porous back support, upon this a non-catalytic but ion conductive intermediate layer and an active catalyst layer. The active catalyst layer which consists of a catalyst, acetylene black and PTFE is further coated, however, with a NAFION® layer.

The invention aims to provide a gas diffusion electrode with catalyst for an electrochemical cell with solid electrolyte which allows for an even more efficient use of the catalyst and which is particularly suited as an oxygen electrode for a fuel cell, whereby the electrode can work with a large output under atmospheric pressure and with air.

This aim is reached according to the invention in that the intermediate layer contains a mixture of electron conductive material and a proton conductive ionomer, and in that the active layer forms the outside layer and the catalyst particles are bound by a proton conductive ionomer.

Practically, the catalyst has the form of platinized carbon.

According to a particular embodiment of the invention, the proton conductive ionomer is NAFION®.

The intermediate layer practically consists of carbon powder and ionomer, whereas the catalytic layer practically consists of platinized carbon powder and the ionomer.

The invention also concerns a method which is particularly suited for making the gas diffusion electrode according to the invention.

Thus, the invention aims to provide a method which differs from the above-described known methods and allows for an optimum use of the catalyst and makes it possible to obtain a very efficient electrode.

Consequently, the invention concerns a method for making a gas diffusion electrode with a catalyst for an electrochemical cell with solid electrolyte, according to which method a catalyst-free intermediate layer is sprinkled on a porous hydrophobic back support in the form of a liquid which contains an electron conductive material in a solvent and, after the removal of the solvent, an active catalyst layer is sprinkled in the form of a liquid which contains at least catalyst particles and a solvent, and which is characterized in that an ink of an electron conductor and an ionomer in a solvent is sprinkled or atomized as an intermediate layer, and a suspension of catalyst particles and an ionomer in a solvent as an active catalytic layer.

Other particularities and advantages of the invention will become clear from the following description of a gas diffusion electrode with catalyst for an electrochemical cell with solid electrolyte and of a method for making such an electrode, according to the invention. This description is given as an example only and does not limit the invention in any way.

BRIEF DESCRIPTION OF THE DRAWINGS

FIG. 1 shows a fuel cell with solid electrolyte of what is called a PEM (Proton Exchange Membrane) cell of a type known as such. This fuel cell is mainly composed of the assembly of a cathode 1, an anode 2 and in between them a solid electrolyte membrane 3, which assembly is clamped between two electrically conductive foils or plates 4 against which is provided a metal current collector 5 on the outside.

Figure 1:
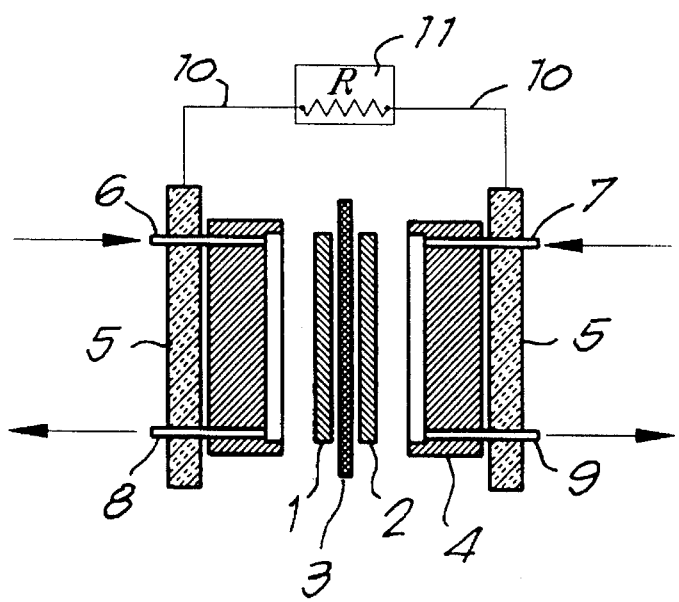
FIG. 1 schematically shows a fuel cell provided with an electrode according to the invention.

The plates 4 are provided with grooves along which the reacting gases which are supplied via ducts 6 or 7 are distributed over the cathode 1 and the anode 2.

To the oxidizing electrode or anode 2 is supplied hydrogen via the duct 7 which is catalytically disintegrated in hydrogen ions which flow through the solid electrolyte membrane 3 to the reducing electrode or cathode 1 to which is supplied oxygen via the duct 6. Here, the hydrogen ions react catalytically with the oxygen and with electrons so as to form water.

The reaction products and the excess of supplied oxygen and hydrogen are carried off via the ducts 8 and 9 in the plates 4.

The current which is produced by the above-mentioned electrochemical reactions is guided via the current collectors 5 and the electric cables 10 connected onto it to an electric load 11.

As an anode 2 can be used an E-TEK electrode, whereas the solid electrolyte membrane 3 is made of an ion exchanging polymer or ionomer. Such ionomers are available on the market and are usually perfluoric sulphonic acids, i.e. polymers which resemble polytetrafluoroethylene with lateral branches ending in sulphonic acid groups. A very suited ionomer is the one which is marketed under the trade mark NAFION® of Du Pont de Nemours. The thickness of the membrane is normally situated between 50 and 175 micrometers.

Figure 2:
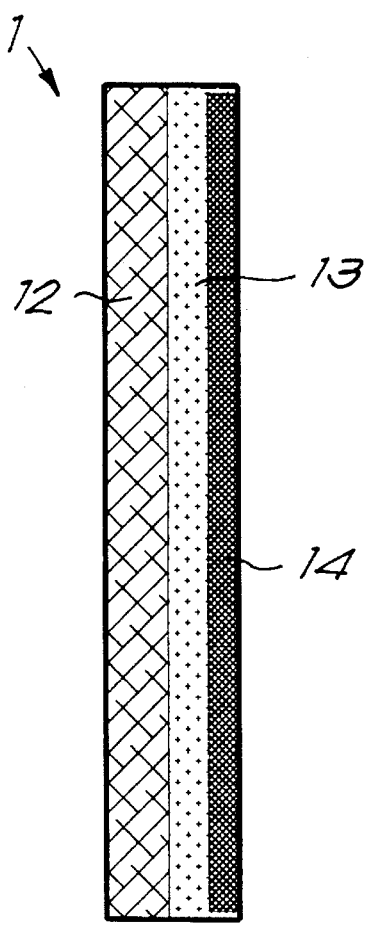
FIG. 2 schematically shows a section of the abovementioned electrode, to a larger scale.

The invention is characterized in that the composition of the cathode 1 which, as represented in detail in FIG. 2, consists of a back support 12, a transition or intermediate layer 13, and an active catalytic layer 14.

The back support functions as a current collector and support for the catalytic layer. This back support can be made of corrosion-resistant metal gauze such as RVS 316L, or carbon paper, but it is preferably made of carbon fabric such as CPW-003 carbon fabric of TEXTRON USA or TCM 128 and TGM 389 carbon fabric of LE CARBONELORRAINE from France.

On the carbon fabric is provided a layer of a mixture of electron conductive material such as carbon with a hydrophobic rendering material such as polytetrafluoroethylene (PTFE). This mixture does not only provide a hydrophobic character to the whole, but also fills the large pores of the fabric so as to render a relatively smooth surface upon which the other layers can then be provided. The optimum amount of PTFE in the mixture is 15 to 20 percentage by weight.

This back support 12 has a good electrical conductivity, is sufficiently porous for a good supply and carrying off of reaction gases and reaction products, and is hydrophobic and mechanically stable.

The intermediate layer 13 is free of catalyst and consists of a mixture of carbon and an ionomer in a relation between $2/10$ and $3/10$. Practically, about 0.10 to 0.30 and preferably about 0.16 mg per $cm^2$ carbon and 0.30 to 1.5 mg per $cm^2$ and preferably about 0.70 mg per $cm^2$ ionomer is provided on the back support in this manner. A suited ionomer is the above-mentioned NAFION®.

The catalytic layer 14 consists of a mixture of Pt/C particles and ionomer. Such catalyst particles whereby platinum particles adhere to carbon granules are marketed among others by E-TEK. They contain 10 to 40 percentage by weight of platinum on XC-72 carbon powder. The amount of Pt/C particles strongly depends of the electrochemical reactions to be carried out as well as of the cell parameters, and is for example such that the amount of Pt per $cm^2$ is situated between 0.10 and 0.50 and preferably between 0.21 mg and 0.43 mg per $cm^2$.

The above-mentioned electrode is made as follows.

The back support is made separately. The carbon is crushed in a mortar so as to break the agglomerates, and a mixture is made of the obtained carbon with an organic binding agent such as PTFE in suspension in a weight ratio of about 2 to 1. This mixture is diluted with demineralized water and it is stirred for one hour with a magnetic agitator. As a result, the fibres of the binding agent will adhere to the carbon granules.

Subsequently, the mixture is filtered in a glass fibre filter and the filtered-off paste is spread out on a carbon fabric which has been soaked in the meantime in a hydrophobic rendering material such as PTFE in a suspension, diluted with water in a weight ratio of 5/1.

Use is made to this end of a scraping mould of about 0.40 mm deep on the bottom of which the carbon fabric is fixed with one edge. The paste which is provided on this carbon fabric and which is moved over the protruding edges of the mould, is provided a constant thickness of about 0.40 mm by means of a scraping knife, while pressing it in the fabric.

After it has dried for some ten hours at room temperature, the coated carbon fabric is put in an oven, where it is further dried for one hour at 40° C. Subsequently, the temperature is raised until sintering of the hydrophobic rendering material is obtained, for example to 380° C.

The thus obtained back support is put on a rotating table or a moving belt, and first the transition film is provided in several stages, preferably in two stages, with a break between each stage so as to let the applied layer dry. Each layer is applied by means of the sprinkling or atomizing of an ink which is made by making a suspension of an electron conductive material such as carbon in a solution of ionomer, in particular NAFION® and a solvent such as ethanol.

It is essential that the ink is homogenous, which is obtained by treating the mixture, after shaking and mixing it, in an ultrasonic bath for some twenty hours.

After the intermediate layer has been applied, it is further evaporated in an oven at 85° C. for 1 hour.

Finally, the catalytic layer is applied in a similar manner in several and preferably two stages, whereby an ink is sprinkled or atomized at each stage consisting of a suspension of a catalyst and a solution of proton conductive ionomer such as NAFION® and a solvent such as ethanol.

In order to make the fuel cell, the above-mentioned electrode as a cathode, a membrane consisting of a proton conductive ionomer and the anode are hot-pressed together into one unit in a known manner.

The invention will be further explained by means of the following practical examples.

EXAMPLE 1

A back support was made by mixing 66 percentage by weight of VULCAN XC-72 carbon of CABOT CORP. with 34 percentage by weight of a commercialized PTFE suspension (PTFE 30N of Du Pont). The whole was diluted with demineralized water and mixed for one hour with a magnetic agitator.

The homogenous mixture was filtered off in a glass fibre filter (Whatman GF/A-B).

Simultaneously, a carbon fabric CPW-003 of TEXTRON was soaked in PTFE 30N of Du Pont diluted with water in a weight ratio of 5 $H_2O$/1 PTFE suspension. This wet carbon fabric was fixed at the bottom of a scraping mould. The filtered off paste was applied on this fabric and pressed in the carbon fabric by means of a scraping knife and at the same time levelled to a thickness of 0.40 mm.

After it was dried for some 10 hours at room temperature, the carbon fabric was put in an oven and further dried at 40° C. for 1 hour, after which the oven temperature was raised to 380° C. for 2 hours until the PTFE was sintered.

The thus obtained back support was fixed on a rotating table which was rotated at a speed of about 40 rotations per minute. By means of a sprinkler head placed eccentrically above it, an ink for an intermediate layer was atomized in two stages with two minutes drying with infrared rays in between the two stages.

The ink was prepared by mixing 10 g of carbon XC-72 of CABOT and 1 liter of a 5% NAFION solution of SOLUTION TECHNOLOGY INC. and 1 liter of ethanol and by shaking it on a roller table, and by subsequently making this mixture homogeneous by treating it in an ultrasonic bath for some 20 hours.

The back support with the intermediate layer was further evaporated in an oven at 85° C. for 1 hour.

The thickness of the intermediate layer, which is a few micrometers, is such that 0.16 mg/cm$^2$ carbon and 0.70 mg/cm$^2$ NAFION® is present in dry form on the back support.

In exactly the same manner as for the intermediate layer, a catalyst layer is atomized on said intermediate layer in two stages.

The ink for this sprinkling was prepared by mixing 50 g of catalyst 20% Pt/C of E-TEK with 1 liter of a 5% solution of NAFION® of SOLUTION TECHNOLOGY INC. and 1 liter of ethanol.

The atomizing was done such that an amount of 0.43 mg Pt/cm$^2$ was obtained.

The thus made electrode was cut to a surface of 50 cm$^2$ and used as a cathode in a fuel cell.

The electrode was processed into a single unit with a NAFION® 117 solid electrolyte membrane which was made in the usual manner and cleaned, and an electrode of E-TEK available on the market as an anode.

To this end, the electrodes were placed on either side of the still wet membrane, with glass fibre-reinforced PTFE foil on the outside thereof with a recess of the size of the electrode surface, and a metal plate in RVS on the outside of 0.5 mm thick, screened off from the electrodes by a PTFE film of 0.25 mm thick.

The whole was hot-pressed in a press. Said hot-pressing was carried out at 135° C. during 120 sec at a pressure of 50 kPa and during 30 sec at a pressure of 6000 kPa.

The obtained single cell was mounted in a cell housing, and oxygen and hydrogen were added to the cathode and anode respectively at different pressure heights. The results, at a cell temperature of 80° C., are represented in the table below.

EXAMPLE 2

The example 1 was repeated entirely, but at the stage of the sprinkling of the ink with the catalyst, the sprinkling was stopped when the amount of Pt on the intermediate layer was 0.21 mg Pt/cm$^2$. The results, at a cell temperature of 80° C., are also represented in the following table.

| Ex. | Cathode Pt-load mg Pt/cm$^2$ | Pressure (Kpa) $H^2$ | $O_2$ | Air | Power (mW/cm$^2$) Max. at 0.6 V cell tension | |
| --- | --- | --- | --- | --- | --- | --- |
| 1 | 0.43 | 125 | 125 | — | 456 | 362 |
|   |      | 200 | 210 | — | 436 | 394 |
|   |      | 300 | 310 | — | 457 | 425 |
|   |      | 125 | —   | 180 | 355 | 296 |
|   |      | 200 | —   | 220 | 341 | 287 |
|   |      | 300 | —   | 320 | 384 | 341 |
| 2 | 0.21 | 125 | 125 | — | 261 | 205 |
|   |      | 200 | 210 | — | 200 | 242 |
|   |      | 300 | 310 | — | 302 | 265 |
|   |      | 125 | —   | 180 | 200 | 163 |
|   |      | 200 | —   | 220 | 222 | 195 |
|   |      | 300 | —   | 320 | 221 | 195 |

The fuel cell provides excellent results. A minimum amount of Pt catalyst is used, and moreover it is optimally used.

Thanks to the non-catalytic intermediate layer 13, the tension on the partition between the thin catalytic layer and the back support is removed.

The use of NAFION® or a similar ionomer clearly offers better results than the use of PTFE as a binding agent for the non-catalytic intermediate layer 13 and for the catalytic layer 14. Also the fact that this layer is made by means of the sprinkling or atomizing of an ink seems to have a positive effect on the results.

We claim:

1. A gas diffusion electrode with catalyst for an electrochemical fuel cell with solid electrolyte comprising the following:

(a) a hydrophobic, porous back support (12);

(b) a non-catalytic intermediate layer (13) comprising a mixture of an electron conductive material and a proton conductive ionomer; and (c) an active catalytic layer (14) which forms an outside layer of the electrode and which comprises catalyst particles bound by a proton conductive ionomer.

2. A method for making a gas diffusion electrode with catalyst for an electrochemical fuel cell with solid electrolyte comprising the following steps:

(a) forming a non-catalytic intermediate layer (13) by sprinkling or atomizing onto a porous hydrophobic back support (12) a liquid ink comprising an electron conductive material and an ionomer in a solvent;

(b) removing the solvent from the intermediate layer; and (c) forming an active catalyst layer (14) by sprinkling or atomizing onto the intermediate layer a liquid ink comprising catalyst particles and an ionomer in a solvent.

3. The diffusion electrode according to claim 1, wherein the intermediate layer (13) consists of electrically conductive powder and a proton conductive ionomer.

4. The gas diffusion electrode according to claim 1, wherein the proton conductive ionomer is a perfluoric sulphonic acid polymer.

5. The gas diffusion electrode according to claim 1, wherein the electron conductive material in the intermediate layer (13) is carbon powder, and the catalyst particles in the catalytic layer (14) are platinized carbon powder.

6. The gas diffusion electrode according to claim 1, wherein the back layer (12) consists of carbon cloth filled with a mixture of carbon powder and an organic hydrophobic binding agent.

7. The gas diffusion electrode according to claim 6, wherein the organic hydrophobic binding agent is PTFE.

8. The gas diffusion electrode according to claim 3, wherein the proton conductive ionomer is a perfluoric sulphonic acid polymer.

9. The gas diffusion electrode according to claim 3, wherein the intermediate layer (13) comprises a mixture of carbon powder and a perfluoric sulphonic acid polymer.

10. The gas diffusion electrode according to claim 7, wherein the PTFE is present in the amount of 15-20% by weight of the binding agent.

11. The gas diffusion electrode according to claim 1, wherein the active catalytic layer (14) comprises platinized carbon particles bound by a perfluoric sulphonic acid polymer.

12. The gas diffusion electrode according to claim 1, wherein the intermediate layer (13) consists essentially of a mixture of an electron conductive material and a proton conductive ionomer.

13. The gas diffusion electrode according to claim 1, wherein (a) the hydrophbobic, pororous back support (12) comprises carbon cloth filled with a mixture of carbon powder and an organic hydrophobic binding agent;

(b) the non-catalytic intermediate layer (13) comprises carbon powder and a perfluoric sulphonic acid polymer; and (c) the active catalytic layer (14) comprises platinized carbon powder and a perfluoric sulphonic acid polymer.

14. An electrochemical fuel cell with solid electrolyte comprising the gas diffusion electrode with catalyst according to claim 1.

15. The gas diffusion electrode according to claim 1, wherein the catalyst has the form of platinized carbon.

16. The method according to claim 2, wherein the back support (12) is made by applying a paste of an electrically conductive material and an organic hydrophobic binding agent on a fabric fixed in a scraping mould and by pressing the paste in said fabric so as to obtain a uniform thickness by means of a scraping knife which is moved over the mould.

17. The method according to claim 2, wherein the intermediate layer (13) and the catalyst layer (14) are sprinkled in several stages with a break between each stage so as to let the layer applied in the preceding stage dry.

18. The method according to claim 16, wherein the intermediate layer (13) and the catalyst layer (14) are sprinkled in several stages with a break between each stage so as to let the layer applied in the preceding stage dry.

* * * * *